US011847241B1

(12) United States Patent
Cahill et al.

(10) Patent No.: US 11,847,241 B1
(45) Date of Patent: Dec. 19, 2023

(54) MANAGEMENT OF SERVICE PERMISSIONS

(71) Applicant: Amazon Technologies, Inc., Seattle, WA (US)

(72) Inventors: Conor Patrick Cahill, Waterford, VA (US); Jasmeet Chhabra, Bellevue, WA (US); Travis William Hickey, Snoqualmie, WA (US); Ahmad Kayed Kamel Aljolani, Seattle, WA (US); Daniel Stephen Popick, Seattle, WA (US); Akshay Mohan Sumant, Issaquah, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 13 days.

(21) Appl. No.: 15/958,520

(22) Filed: Apr. 20, 2018

(51) Int. Cl.
  *G06F 21/62* (2013.01)
  *H04L 9/40* (2022.01)
  *G06F 21/60* (2013.01)
  *H04L 67/10* (2022.01)

(52) U.S. Cl.
  CPC ........ *G06F 21/6218* (2013.01); *G06F 21/604* (2013.01); *H04L 63/102* (2013.01); *H04L 63/20* (2013.01); *G06F 2221/2141* (2013.01); *H04L 67/10* (2013.01)

(58) Field of Classification Search
  CPC ............... G06F 21/6218; G06F 21/604; G06F 2221/2141; H04L 63/102; H04L 63/20; H04L 67/10
  See application file for complete search history.

(56) References Cited

U.S. PATENT DOCUMENTS

| 5,842,125 | A | * | 11/1998 | Modzelesky | ...... | H04B 7/18578 455/430 |
| 6,058,307 | A | * | 5/2000 | Garner | ............... | H04B 7/18567 455/12.1 |
| 6,112,085 | A | * | 8/2000 | Garner | ............... | H04B 7/18567 455/430 |
| 6,182,142 | B1 | * | 1/2001 | Win | ...................... | G06F 21/604 709/219 |
| 6,305,020 | B1 | * | 10/2001 | Hoarty | ................. | H04N 21/812 348/E7.071 |
| 6,321,242 | B1 | * | 11/2001 | Fogg | ..................... | G06F 16/958 715/236 |

(Continued)

FOREIGN PATENT DOCUMENTS

| CN | 102150151 B | * | 10/2013 | ............. | G06F 9/546 |
| CN | 109542334 A | * | 3/2019 | ............. | G06F 21/30 |

OTHER PUBLICATIONS

Amazon—AWS Identity and Access Management API Reference API Version May 8, 2010, pp. 1-501.*

(Continued)

*Primary Examiner* — James R Turchen
*Assistant Examiner* — James J Wilcox
(74) *Attorney, Agent, or Firm* — Davis Wright Tremaine LLP

(57) ABSTRACT

A request to modify a set of permissions (e.g., delete the permissions, replace the set of permissions with a different set of permissions) is received at a computing device. A set of services are prevented from using the set of permissions to access resources. The set of permissions are changed while the set of services are prevented from using the set of permissions to access resources.

20 Claims, 8 Drawing Sheets

(56) References Cited

U.S. PATENT DOCUMENTS

| | | | | |
|---|---|---|---|---|
| 7,096,316 B1* | 8/2006 | Karr | G06F 3/0659 | 714/6.24 |
| 7,356,819 B1* | 4/2008 | Ricart | G06F 9/50 | 712/30 |
| 7,577,999 B2* | 8/2009 | Narin | G06F 21/10 | 713/176 |
| 8,285,573 B1* | 10/2012 | Ballaro | G06Q 10/087 | 705/22 |
| 9,130,910 B1* | 9/2015 | Logue | H04L 63/0823 | |
| 9,241,270 B1* | 1/2016 | Logue | G06F 21/44 | |
| 9,294,340 B1* | 3/2016 | Logue | G06F 16/258 | |
| 9,531,719 B1* | 12/2016 | Sutton | H04L 63/083 | |
| 9,640,061 B1* | 5/2017 | Klimanis | G08B 25/10 | |
| 9,774,586 B1* | 9/2017 | Roche | H04L 63/08 | |
| 9,894,067 B1* | 2/2018 | Mandadi | H04L 63/0807 | |
| 9,916,545 B1* | 3/2018 | de Kadt | G06Q 10/06 | |
| 10,454,975 B1* | 10/2019 | Sharifi Mehr | H04L 63/20 | |
| 10,475,002 B2* | 11/2019 | Silva | H04W 4/80 | |
| 10,666,657 B1* | 5/2020 | Threlkeld | H04L 9/0643 | |
| 10,673,862 B1* | 6/2020 | Threlkeld | G06F 21/62 | |
| 10,715,514 B1* | 7/2020 | Threlkeld | H04L 63/0807 | |
| 10,819,747 B1* | 10/2020 | Sedky | H04L 63/105 | |
| 10,963,375 B1* | 3/2021 | Wicker | G06F 12/0253 | |
| 10,986,131 B1* | 4/2021 | Kruse | H04L 63/10 | |
| 11,102,189 B2* | 8/2021 | O'Neill | H04L 63/0815 | |
| 11,425,126 B1* | 8/2022 | Horal | H04L 63/10 | |
| 11,522,812 B1* | 12/2022 | Thoppai | H04L 47/781 | |
| 11,552,948 B1* | 1/2023 | Peterson | H04L 63/102 | |
| 2004/0002958 A1* | 1/2004 | Seshadri | G06F 16/9535 | |
| 2004/0002972 A1* | 1/2004 | Pather | H04L 67/55 | |
| 2004/0002988 A1* | 1/2004 | Seshadri | G06F 16/24568 | 707/999.102 |
| 2005/0289524 A1* | 12/2005 | McGinnes | G06F 8/10 | 717/140 |
| 2007/0143827 A1* | 6/2007 | Nicodemus | G06F 21/6218 | 726/2 |
| 2008/0120129 A1* | 5/2008 | Seubert | G06Q 10/06 | 705/35 |
| 2008/0168135 A1* | 7/2008 | Redlich | G06F 16/282 | 709/204 |
| 2008/0276234 A1* | 11/2008 | Taylor | G06F 8/60 | 717/177 |
| 2009/0144045 A1* | 6/2009 | Kanade | G06F 30/30 | 703/21 |
| 2009/0254572 A1* | 10/2009 | Redlich | G06Q 10/06 | |
| 2009/0265361 A1* | 10/2009 | Nagami | G06F 9/5072 | |
| 2010/0010968 A1* | 1/2010 | Redlich | G06Q 10/00 | 707/E17.046 |
| 2010/0064256 A1* | 3/2010 | Esaki | H04N 1/00413 | 715/825 |
| 2010/0191705 A1* | 7/2010 | Barabas | G06F 16/2379 | 707/626 |
| 2010/0218108 A1* | 8/2010 | Crabtree | G06Q 50/06 | 715/738 |
| 2010/0250497 A1* | 9/2010 | Redlich | H04L 63/105 | 707/661 |
| 2010/0299738 A1* | 11/2010 | Wahl | G06F 21/33 | 713/170 |
| 2010/0332373 A1* | 12/2010 | Crabtree | G06Q 40/04 | 709/224 |
| 2011/0082854 A1* | 4/2011 | Eidson | G06F 16/24544 | 707/714 |
| 2011/0276507 A1* | 11/2011 | O'Malley | G06Q 10/00 | 705/321 |
| 2012/0089735 A1* | 4/2012 | Attaluri | G06F 9/526 | 709/226 |
| 2012/0150692 A1* | 6/2012 | Dueck | G06Q 10/06312 | 705/26.81 |
| 2012/0307281 A1* | 12/2012 | Sweet | G06F 3/1288 | 358/1.14 |
| 2013/0132854 A1* | 5/2013 | Raleigh | G06F 3/0482 | 715/738 |
| 2013/0268437 A1* | 10/2013 | Desai | G06Q 20/36 | 705/41 |
| 2014/0020068 A1* | 1/2014 | Desai | G06Q 20/3227 | 726/4 |
| 2014/0068718 A1* | 3/2014 | Mureinik | G06F 21/53 | 726/4 |
| 2014/0084165 A1* | 3/2014 | Fadell | H05B 47/19 | 250/340 |
| 2014/0085092 A1* | 3/2014 | Fadell | H04L 12/282 | 340/603 |
| 2014/0085093 A1* | 3/2014 | Mittleman | G08B 21/14 | 29/832 |
| 2014/0089185 A1* | 3/2014 | Desai | G06Q 10/067 | 705/41 |
| 2014/0173594 A1* | 6/2014 | Ng | G06F 9/45533 | 718/1 |
| 2014/0207612 A1* | 7/2014 | Isaacson | G06Q 40/02 | 705/26.8 |
| 2014/0266669 A1* | 9/2014 | Fadell | G08B 27/003 | 340/501 |
| 2014/0289207 A1* | 9/2014 | Moloian | G06F 16/2365 | 707/687 |
| 2014/0289402 A1* | 9/2014 | Moloian | G06F 11/3051 | 709/224 |
| 2014/0289793 A1* | 9/2014 | Moloian | G06F 16/283 | 726/1 |
| 2014/0289796 A1* | 9/2014 | Moloian | H04L 63/101 | 726/2 |
| 2014/0289846 A1* | 9/2014 | Moloian | G06F 21/604 | 726/21 |
| 2014/0298423 A1* | 10/2014 | Moloian | G06F 16/283 | 726/4 |
| 2014/0317707 A1* | 10/2014 | Kim | H04L 67/104 | 726/6 |
| 2015/0061859 A1* | 3/2015 | Matsuoka | G08B 25/008 | 340/501 |
| 2015/0070181 A1* | 3/2015 | Fadell | G08B 21/22 | 340/628 |
| 2015/0094968 A1* | 4/2015 | Jia | G05B 15/02 | 702/60 |
| 2015/0096876 A1* | 4/2015 | Mittleman | H04N 5/77 | 200/341 |
| 2015/0100167 A1* | 4/2015 | Sloo | G08B 29/02 | 700/278 |
| 2015/0109104 A1* | 4/2015 | Fadell | G08B 27/005 | 340/5.7 |
| 2015/0109112 A1* | 4/2015 | Fadell | G08B 19/005 | 340/328 |
| 2015/0109128 A1* | 4/2015 | Fadell | G08B 25/008 | 340/540 |
| 2015/0116106 A1* | 4/2015 | Fadell | G06Q 10/0631 | 340/501 |
| 2015/0116107 A1* | 4/2015 | Fadell | G06Q 10/083 | 340/501 |
| 2015/0116108 A1* | 4/2015 | Fadell | G08B 27/003 | 340/501 |
| 2015/0116109 A1* | 4/2015 | Fadell | G06Q 10/0631 | 340/501 |
| 2015/0120015 A1* | 4/2015 | Fadell | G05B 15/02 | 700/90 |
| 2015/0120596 A1* | 4/2015 | Fadell | G08B 19/005 | 705/330 |
| 2015/0120598 A1* | 4/2015 | Fadell | G06Q 10/083 | 705/333 |
| 2015/0127712 A1* | 5/2015 | Fadell | H04L 12/2807 | 709/202 |
| 2015/0145643 A1* | 5/2015 | Fadell | G08B 29/185 | 340/5.51 |
| 2015/0149781 A1* | 5/2015 | Logue | H04L 49/254 | 713/168 |
| 2015/0154850 A1* | 6/2015 | Fadell | G06Q 10/083 | 340/501 |
| 2015/0156030 A1* | 6/2015 | Fadell | G06Q 10/083 | 700/90 |
| 2015/0156031 A1* | 6/2015 | Fadell | G08B 27/003 | 700/90 |

(56) References Cited

U.S. PATENT DOCUMENTS

| | | | | |
|---|---|---|---|---|
| 2015/0269383 A1* | 9/2015 | Lang | G06F 21/57 | 726/1 |
| 2015/0276237 A1* | 10/2015 | Daniels | F24D 19/10 | 237/2 A |
| 2015/0276238 A1* | 10/2015 | Matsuoka | F24D 19/1081 | 700/278 |
| 2015/0276239 A1* | 10/2015 | Fadell | H04L 12/6418 | 236/51 |
| 2015/0276266 A1* | 10/2015 | Warren | F24D 19/1081 | 700/300 |
| 2015/0287310 A1* | 10/2015 | Deliuliis | H05K 999/99 | 340/628 |
| 2015/0300892 A1* | 10/2015 | Malhotra | H04L 12/2807 | 702/130 |
| 2015/0302398 A1* | 10/2015 | Desai | G06Q 20/40 | 705/41 |
| 2015/0350105 A1* | 12/2015 | Nagarajan | H04L 41/5054 | 709/225 |
| 2015/0372954 A1* | 12/2015 | Dubman | H04L 43/04 | 709/206 |
| 2015/0373022 A1* | 12/2015 | Dubman | H04L 12/2825 | 726/3 |
| 2015/0373149 A1* | 12/2015 | Lyons | H04L 12/2829 | 709/203 |
| 2016/0043827 A1* | 2/2016 | Filson | H04K 3/22 | 370/252 |
| 2016/0057107 A1* | 2/2016 | Call | H04L 63/02 | 726/11 |
| 2016/0071386 A1* | 3/2016 | Mittleman | G08B 17/107 | 73/31.03 |
| 2016/0080273 A1* | 3/2016 | Yang | G06N 20/00 | 709/224 |
| 2016/0099934 A1* | 4/2016 | Logue | H04L 9/3265 | 713/168 |
| 2016/0105288 A1* | 4/2016 | Logue | G06F 21/33 | 713/156 |
| 2016/0105423 A1* | 4/2016 | Logue | H04L 9/3268 | 726/10 |
| 2016/0105424 A1* | 4/2016 | Logue | H04L 12/2809 | 726/7 |
| 2016/0116343 A1* | 4/2016 | Dixon | G05B 15/02 | 250/342 |
| 2016/0123618 A1* | 5/2016 | Hester | F24F 11/64 | 700/276 |
| 2016/0123619 A1* | 5/2016 | Hester | H04L 12/2803 | 700/276 |
| 2016/0201933 A1* | 7/2016 | Hester | F24F 11/48 | 700/276 |
| 2016/0201934 A1* | 7/2016 | Hester | F24F 11/89 | 700/276 |
| 2016/0260135 A1* | 9/2016 | Zomet | H04L 67/535 | |
| 2016/0294840 A1* | 10/2016 | El Khoury | H04L 63/102 | |
| 2016/0314782 A1* | 10/2016 | Klimanis | G10L 15/065 | |
| 2016/0316293 A1* | 10/2016 | Klimanis | G10L 25/54 | |
| 2016/0374133 A1* | 12/2016 | Logue | H04W 76/14 | |
| 2017/0003736 A1* | 1/2017 | Turon | H04L 12/2816 | |
| 2017/0048280 A1* | 2/2017 | Logue | H04L 63/0823 | |
| 2017/0063931 A1* | 3/2017 | Seed | H04L 67/12 | |
| 2017/0082987 A1* | 3/2017 | Reddy | H04L 67/12 | |
| 2017/0161347 A1* | 6/2017 | Raza | H04L 67/01 | |
| 2017/0201850 A1* | 7/2017 | Raleigh | H04W 4/50 | |
| 2017/0329957 A1* | 11/2017 | Vepa | G06F 21/445 | |
| 2017/0331832 A1* | 11/2017 | Lander | H04L 63/102 | |
| 2017/0339196 A1* | 11/2017 | Lewis | H04L 63/083 | |
| 2017/0353449 A1* | 12/2017 | Ohbitsu | G06F 21/31 | |
| 2018/0018470 A1* | 1/2018 | Aggarwal | G06F 3/0486 | |
| 2018/0032706 A1* | 2/2018 | Fox | G06F 21/121 | |
| 2018/0102992 A1* | 4/2018 | Pysanets | H04L 51/58 | |
| 2018/0213405 A1* | 7/2018 | Jung | H04W 12/069 | |
| 2018/0248888 A1* | 8/2018 | Takahashi | H04W 12/08 | |
| 2019/0052683 A1* | 2/2019 | Logue | H04W 12/04 | |
| 2019/0132320 A1* | 5/2019 | Burckhardt | G06F 21/6218 | |
| 2019/0199750 A1* | 6/2019 | Chen | H04L 41/22 | |
| 2019/0260754 A1* | 8/2019 | Hecht | H04L 41/12 | |
| 2019/0266496 A1* | 8/2019 | Florissi | G06Q 20/065 | |
| 2019/0274086 A1* | 9/2019 | Cui | H04W 4/70 | |
| 2019/0317949 A1* | 10/2019 | Florissi | G06F 16/2471 | |
| 2019/0349426 A1* | 11/2019 | Smith | H04L 61/5069 | |
| 2020/0045519 A1* | 2/2020 | Raleigh | H04M 15/765 | |
| 2021/0240818 A1* | 8/2021 | Seksenov | G06F 16/986 | |
| 2021/0345939 A1* | 11/2021 | Jumbe | H04R 1/46 | |
| 2022/0086179 A1* | 3/2022 | Levin | H04W 12/63 | |

OTHER PUBLICATIONS

Atlassian—Restricting Resource to a Specific Region, Nov. 9, 2016, pp. 1-4.*

Google Translation of CN102150151 (Year: 2013).*

Barr et al ("Barr," Amazon Web Services: Building Fault-Tolerant Applications on AWS, Oct. 2011, pp. 1-15).*

Microsoft Microsoft Dynamics SL: Security Guidelines for Microsoft Dynamics SL, Release 2015, pp. 1-44 (Year: 2015).*

Wijesekera et al "The Feasibility of Dynamically Granted Permissions: Aligning Mobile Privacy with User Preferences," 2017 IEEE Symposium on Security and Privacy, IEEE Computer Society, pp. 1077-1093 (Year: 2017).*

Tari et al "A Role-Based Access Control for Intranet Security," IEEE Internet Computing, pp. 24-34, (Year: 1997).*

Al-Muhtadi "Context and Location-Aware Encryption for Pervasive Computing Environments," IEEE Computer Society, pp. 1-6 (Year: 2006).*

* cited by examiner

MANAGEMENT OF SERVICE PERMISSIONS

BACKGROUND

Modern computer systems typically have different services and resources that can be accessed by users of the computer system. When users request access to the services and resources, such requests is generally verified before access is granted so that a user does not gain access to services and resources outside of that user's set of permissions. One system typically used for providing secure access to services and resources is based on creating short-term session credentials that are associated with an identity such as a role or user. Once a session is established, a user can use the session credentials associated with the session to issue multiple requests over the life of that session.

A role can be used to organize security permissions within a system. In some cases, a service that uses other services to access computing resources has a service-linked role that encodes permissions sufficient to enable the service to use the other services. In modern computer system, the service may be distributed across multiple physical and/or logical regions. Management of permissions in a distributed environment may be difficult because of the global nature of certain resources and the regional nature of other resources. For example, regional services may lack the ability to communicate between regions to determine whether a global resource such as a role is in use to determine whether modifying or deleting the role can be performed in a safe manner that does not cause an inconsistent system state.

BRIEF DESCRIPTION OF THE DRAWINGS

Various techniques will be described with reference to the drawings, in which.

DETAILED DESCRIPTION

Figure 1:
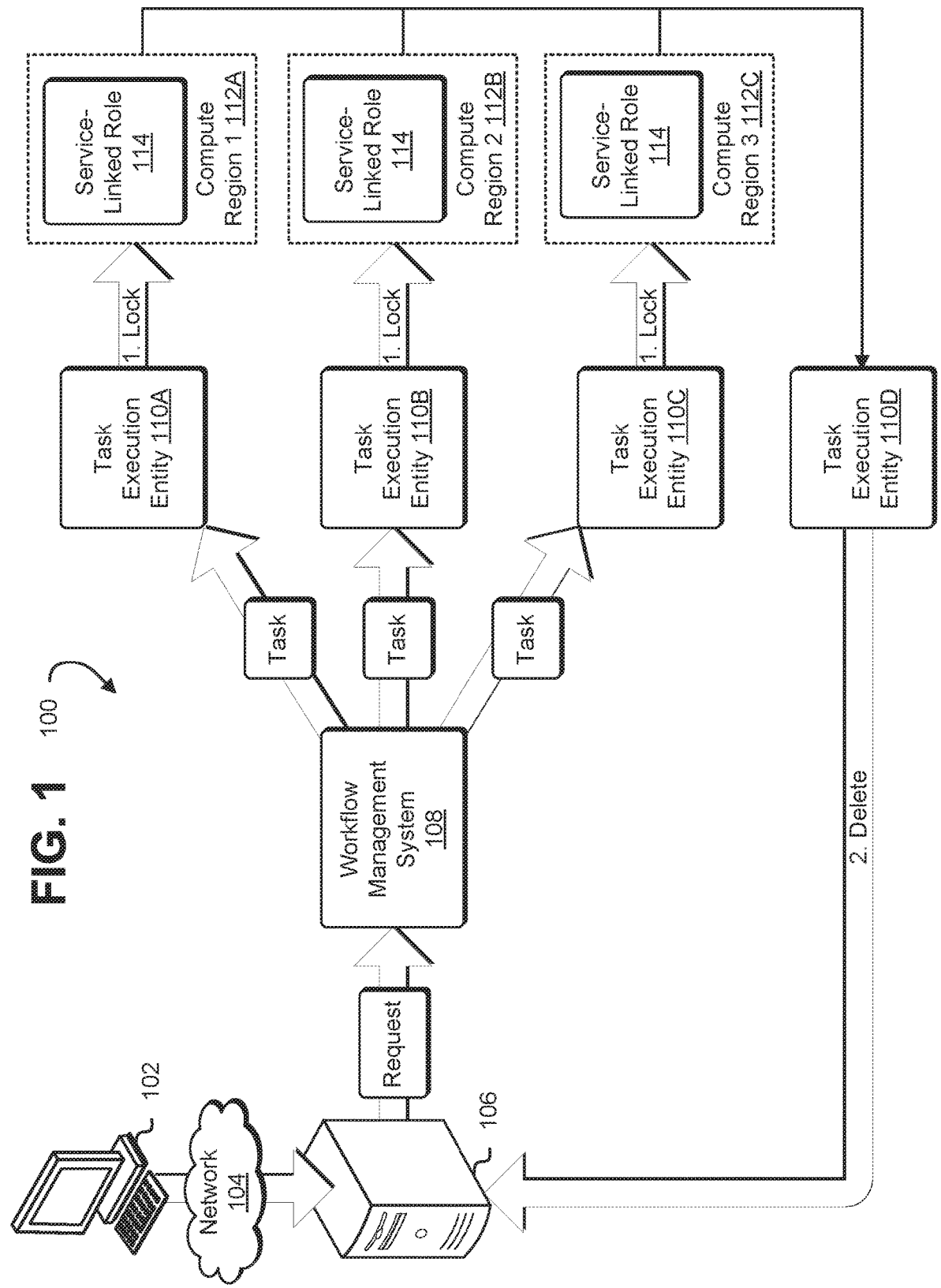
FIG. 1 illustrates a system in which one embodiment may be practiced.

In an embodiment, a customer utilizes a service of a computing resource service provider to provide various services on behalf of the customer. In an embodiment, the service of the computing resource service provider is provisioned with a set of permission to access resources that the service may access on behalf of the customer to fulfill customer requests. In an embodiment, a customer submits a web application programming interface (API) request to a service of a computing resource service provider and the service has an associated service role that enable the service to access computing resources of the computing resource service provider (e.g., via one or more other services of the computing resource service provider) as part of fulfillment of the customer request. In an embodiment, the service role is referred to as a service-linked role (SLR). In an embodiment, a customer has access to a policy management service that can be used to modify permissions associated with principals such as users and roles. In an embodiment, techniques described herein are utilized by a customer to edit and/or delete a SLR. In an embodiment, editing a SLR includes changing the set of permissions associated with the SLR from a first set of permissions to a second set of permissions, the first set of permissions being different from the second set of permissions.

In an embodiment, a service-linked role (SLR) refers to a predefined set of permissions associated with a service of a computing resource service provider that includes permissions sufficient to enable the service to call other services on behalf of the customer. In an embodiment, a machine-learning (ML) service of a computing resource service provider has an associated SLR that includes permissions sufficient for the ML service to access a data storage service that provides access to computing resources to store and retrieve training data and evaluation data of a model and a compute resource service that provides access to computing resources such as virtual machine instances that are usable to run a machine-learning algorithm to produce a machine-learning model as an output. In an embodiment, a customer is able to manually create service-linked roles, such as by issuing a command via a command line interface (CLI) or through a graphical user interface (GUI) console. In an embodiment, a service automatically creates the service-linked role as part of an initialization process (e.g., as part of initializing the service or a portion thereof for a customer) or when the user completes a specific action such as creating a resource in the service. In an embodiment, a SLR is a particular type of role, which is representable in any suitable manner, such as through an integer, Boolean, flag of a set of flags, and more. In an embodiment, the service is implemented across one or more regions, which operation independent of each other (e.g., a SLR may be in use in one region but not another).

In an embodiment, a SLR can be modified or deleted using techniques described herein. In an embodiment, a subsystem of a computing resource service provider coordinates global state between multiple regions to determine whether it is safe to modify or delete a SLR, performs one or more operations as a precursor to the modification or deletion of a SLR across multiple regions, and then modifies or deletes the role across the multiple regions. In an embodiment, the one or more operations performed as a precursor to the modification or deletion of the SLR is a lock request to the service instances in each of the regions. In an embodiment, a lock request refers to an API request that is implemented and supported by each of a set of services that uses the service-linked role, and may be implemented in any suitable manner by the set of services and may be implemented differently as between various members of the set of services. In an embodiment, the API is defined by a policy management service.

In an embodiment, a customer sends a request to delete a service-linked role to a policy management service using a console. The policy management service, in an embodiment, generates a task to delete the SLR and submits the task to an asynchronous queue. In an embodiment, the asynchronous queue is implemented by a workflow management system such as those described in accordance with FIG. 3. In an embodiment, caller (e.g., customer) receives an indication of a task identifier in response to the submitted task. In an embodiment, the asynchronous queue returns a task status which indicates whether there is already a pending request to delete the SLR. In an embodiment, task requests are idempotent, meaning that if a request was submitted already for the same SLR, a duplicate asynchronous workflow is not performed and, instead, the already created one is returned to the caller. In an embodiment, a task execution entity polls the asynchronous queue for work, and locks the SLR for deletion in each region of a service. In an embodiment, if each region is successfully locked, the SLR is deleted for each region using the policy management service, and the task status is updated to reflect the successful deletion. In an embodiment, techniques described herein above and below are applicable to a request to modify a service-linked role. In an embodiment, techniques described herein above and below are applicable to requests to modify and/or delete computing resources, which include, but are not limited to: compute resources (e.g., virtual machine resources); storage resources; database resources; migration resources; networking resources; content delivery resources; developer tools; management tools; security, identity, and compliance resources; analytics resources; artificial intelligence resources; internet-of-things (IoT) resources; and more.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In an embodiment, FIG. 1 illustrates a diagram of a system 100 in which an embodiment in accordance with this disclosure can be implemented. In an embodiment, the system 100 includes a client computing device 102, a network 104, a policy management service 106, a workflow management system 108, one or more task execution entities such as the task execution entities 110A, 110B, 110C, and 110D illustrated in FIG. 1, and one or more compute regions such as the compute regions 112A, 112B, and 112C illustrated in FIG. 1, and a service-linked role 114 usable to access computing resources in one or more compute regions.

In an embodiment, a customer refers to a customer computing device that a customer utilizes. The customer, in an embodiment, is a client 102 of a computing resource service provider that is implemented using any suitable computing device. In an embodiment, the client computing device 102 utilizes a network 104 to submit requests to a service of a computing resource service provider. The client, in an embodiment, interacts with a service using a command line interface (CLI) or a graphical user interface (GUI) console. In an embodiment, the console is accessible to the client via a browser running on the client computing device in which the customer is able to view and make changes to services of the computing resource service provider that the customer utilizes.

In an embodiment, the client 102 is a client that uses one or more services of a computing resource service provider such as services that provide access to data resources, compute resources, machine-learning resources, and various other types of resources. In an embodiment, the customer (e.g., client 102) interacts with a service via a set of commands which may be web API requests. In an embodiment, a service that the customer interacts has a service-linked role that is associated with the service wherein the SLR includes sufficient permissions to enable the service to access other services of the computing resource service provider on behalf of the customer. The SLR, in an embodiment, is automatically created as part of an initialization process when a customer first utilizes the service. In an embodiment, a client interacts with a machine-learning (ML) service to perform various ML-related operations such as generating ML models and the ML service has a service-linked role that is usable by the ML service to access various other services that the ML service utilizes to perform operations such as running a machine-learning algorithm to generate a machine-learning model for a customer. In an embodiment, a policy management service 106 is a service of the computing resource service provider that is usable to manage a SLR and fulfills requests such as requests to delete a SLR, modify the permissions associated with a SLR, and more. The service, in an embodiment, is implemented in multiple compute regions such as compute regions 112A, 112B, and 112C wherein each compute region has an instance of the service that is independent from other instances (e.g., implemented and/or using separate hardware such that a failure such as a power outage that affects one compute region does not affect availability of the service via another compute region).

In an embodiment, the network 104 includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network.

In an embodiment, a policy management service 106 refers to a service of a computing resource service provider that is usable to modify permissions associated with a SLR. The policy management service 106, in an embodiment, is used to coordinate changes to a SLR across multiple compute regions that are agnostic to the existence of other compute regions and may not even be aware of the existence of other compute regions. In an embodiment, the policy management service receives a request from the client 102 over the network 104, wherein the request is a request to delete a service-linked role. In an embodiment, verifying global state of whether the SLR is in use across any of a set of compute regions is desirable and/or necessary because deletion of a SLR role that is in use could lead to an inconsistent system state. In an embodiment, the policy management service 106 receives a request from the customer and provides information from the request to a workflow management system 108, wherein the information includes data such as an identifier associated with the role to be deleted. In an embodiment, requests submitted to the workflow management system 108 are idempotent, meaning that if a request was submitted already for the same SLR, a duplicate asynchronous workflow is not performed and, instead, the already created one is returned to the caller.

In an embodiment, the workflow management system 108 includes executable code that, if executed on one or more processors of a computer system, cause the computer system to coordinate the global state of service-linked roles and ensure the safe deletion or modification of SLRs. The workflow management system 108, in an embodiment, implements an asynchronous queue such as those described in connection with FIG. 3. In an embodiment, the workflow management system 108 is implemented using a dynamic database system wherein the policy management system 106 pushes new requests to the dynamic database system and a task execution entity polls for the tasks and executes tasks using compute resources. In an embodiment, the workflow management system 108 includes a two database tables—a request table that is used to guarantee idempotent requests and a task table for performing an asynchronous deletion workflow—and executable instructions for managing state information stored in the database tables. In an embodiment, the workflow management system 108 is in accordance with those discussed in connection with FIG. 5.

In an embodiment, the workflow management system 108 receives a request to delete a role, which may involve performing a series of tasks. In an embodiment, a task is an operation that is performable by a task execution entity, and may be in accordance with various programming models such as MapReduce. In an embodiment, a first set of tasks, if successfully completed, locks access to the use of a service-linked role across a set of regions (e.g., compute regions) and a second set of tasks, if successfully completed, deletes the service-linked role across the set of regions. In an embodiment, the workflow management system 108 coordinates the performance of the tasks so that each region is locked before the SLRs are deleted from any region.

In an embodiment, a task execution entity such as the task execution entities 110A, 110B, 110C, and 110D illustrated in FIG. 1 refers to a computing entity that performs operations related to tasks, such as executing tasks that are collectively used to fulfill a request. In an embodiment, a task execution entity is a node (e.g., computer system) of a distributed system that is configurable to receive instructions (e.g., in the form of metadata, input parameters, and more) to execute instructions that perform a particular task, the particular task being encoded in the instructions. In an embodiment, the node is a worker thread of a plurality of worker threads of a task execution system that polls for tasks to perform. In an embodiment, the task execution system utilizes a pool of worker threads to execute tasks, wherein when an idle worker thread is detected (e.g., as a result of completing a task), the worker thread polls the workflow management system 108 to determine whether there are additional pending tasks to be performed. In an embodiment, the worker thread polls the workflow management system 108 for tasks to perform by reading from a database table that includes tasks and their respective statuses and selects the first task that is does not have a status indicating the task has already been completed or is pending in another worker thread, and executes the task. In an embodiment, the task execution entity runs the task and updates a task database table with the status of the request, which can be in various states such as a "new" status indicating that the task has not yet been executed, an "in progress" status indicating that a worker thread is executing the task, and "completed" status indicating that a worker thread completed execution of the task. In an embodiment, additional state information is included, such as an identifier associated with the worker thread that is processing or has finished processing a request, an indication of whether a completed task was successful or failed (e.g., whether a task to lock a service-linked role in a particular region succeeded or failed), and more.

In an embodiment, such as those in accordance with FIG. 1, the task execution entities (collectively indicated by the numeral 110, which may include additional task execution entities not illustrated in FIG. 1) perform a set of tasks to lock the service-linked roles in each compute region. In an embodiment, the workflow management system 108 uses a database table to determine the status of a request, such as whether each region of a set of regions was successfully locked within a certain time duration, and then cause deletion of the service-linked role in the set of regions in response to determining that the service-linked role was successfully locked from use. In an embodiment, a separate task is performed in connection with detecting that each region of a set of regions was successfully locked within a timeout period, thereby indicating that it is safe to use the policy management service 106 to delete the service-linked role 114.

The task execution entities, in an embodiment, are collectively referred to by numeral 110 and include a set of task execution entities comprising the task execution entities 110A, 110B, 110C, and 110D illustrated in FIG. 1. The task execution entities are implemented in any suitable manner, and, in an embodiment, are worker threads of a thread pool, and different threads can be used to execute tasks—a first worker thread 110A locks the SLR in the first compute region 112A and a different worker thread 110D deletes the service-linked role 114. In an embodiment, nodes of a distributed system are utilized to execute one or more tasks, such as by running tasks in separate threads of a node in a parallelized manner (e.g., multi-threaded execution environment). In an embodiment, a task execution entity receives instructions to execute code that locks a service-linked role of a region by determining a service endpoint and generating a request to lock the service-linked role of the region using the determined service endpoint. In an embodiment, different regions can have different service endpoints, wherein the endpoints are defined in region-specific configuration data, such as region information provider (RIP) configuration data that encodes the standard and authoritative source of information about existing and new (e.g., currently building) regions. In an embodiment, RIP includes information about each region (e.g., region DNS information) as we as to services in a region, and is structured such that each service is expected to provide certain information to on-board and is allowed to store custom configurations. In an embodiment, a thread pool manager (e.g., software hardware or a combination thereof) includes executable instructions that cause the thread pool manager to detect a first worker thread is idle, causes the first worker thread to execute a first task, and then causes the first worker thread to execute a second task (e.g., a worker thread that locks the SLR from use to access resources in a compute region is the same worker thread that deletes the SLR after all regions have been successfully locked). In an embodiment, the workers are run on one or more nodes of a distributed system are utilized to execute one or more tasks, such as by running tasks in separate threads of a node in a parallelized manner (e.g., multi-threaded execution environment).

In an embodiment, a compute region, such compute regions 112A, 112B, and 112C illustrated in FIG. 1, refers to a logical and/or physical partitioning of the resources provided by a computing resource service provider that hosts a variety of services and provide a variety of resources in multiple locations. In an embodiment, locations may include one or more regions (also referred to herein as "zones"), which are logical and/or physical partitions of the services and/or resources. In an embodiment, a first datacenter in a first location (a physical or geographical location) encompasses a single region, which may be identified by that datacenter and/or that location. In an embodiment, a second datacenter in a second location may encompass multiple logical regions. In an embodiment, a region is identified by a collection of datacenters in one or more countries (e.g., "Western Europe"). In an embodiment, different instances of the same service utilize the service-linked roles across multiple regions. In an embodiment, different types of services that are usable to access different resources and/or services are able to utilize the service-linked roles across multiple regions.

In an embodiment, a service-linked role 114 refers to a predefined set of permissions associated with a service of a computing resource service provider that includes permissions sufficient to enable the service to call other services on behalf of the customer. In an embodiment, a machine-learning (ML) service of a computing resource service provider has an associated SLR that includes permissions sufficient for the ML service to access a data storage service that provides access to computing resources to store and retrieve training data and evaluation data of a model and a compute resource service that provides access to computing resources such as virtual machine instances that are usable to run a machine-learning algorithm to produce a machine-learning model as an output. In an embodiment, a customer is able to manually create service-linked roles, such as by issuing a command via a command line interface (CLI) or through a graphical user interface (GUI) console. In an embodiment, a service automatically creates the service-linked role as part of an initialization process (e.g., as part of initializing the service or a portion thereof for a customer) or when the user completes a specific action such as creating a resource in the service. In an embodiment, a SLR is a particular type of role, which is representable in any suitable manner, such as through an integer, Boolean, flag of a set of flags, and more. In an embodiment, the service is implemented across one or more regions, which operation independent of each other (e.g., a SLR may be in use in one region but not another). In an embodiment, FIG. 1, as well as other figures in this disclosure, can be used in the context of modifying and/or deleting other types of resources in addition to the service-linked role 114 illustrated in FIG. 1.

Figure 2:
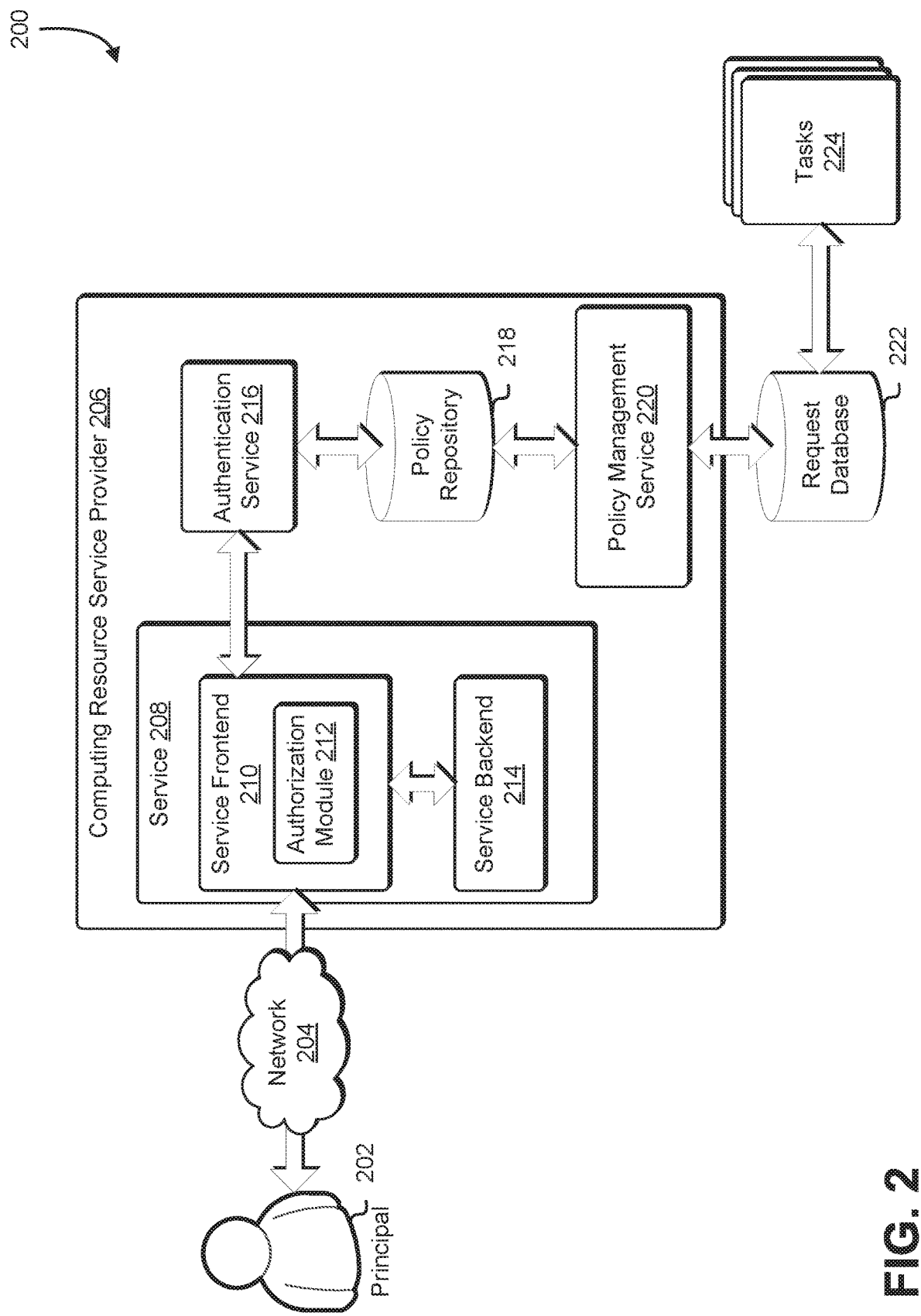
FIG. 2 illustrates a diagram of a system that implements various aspects of the present disclosure in accordance with an embodiment.

FIG. 2 illustrates a diagram of a system 200 in which an embodiment in accordance with this disclosure is implemented. In an embodiment, a principal 202 utilizes a computing device to communicate over a network 204 with a computing resource service provider 206. Communications between the computing resource service provider 206 and the principal 202, in an embodiment, include requests (e.g., web API requests) to access a service 208 operated by the computing resource service provider 206, which is one of many services operated by the computing resource service provider 206. The service 208, in an embodiment, comprises a service frontend 210 and a service backend 214. The principal 202, in an embodiment, through an associated computing device, issues a request for access to a service 208 (and/or a request for access to resources associated with the service 208) provided by a computing resource service provider 206. The principal, in an embodiment, refers to a user, or a group of users, or a role associated with a group of users, or a process representing one or more of these entities running on one or more remote (relative to the computing resource service provider 206) computer systems, or may be some other such computer system entity, user, or process. In an embodiment, each or some user, group, role, or other such collection of principals has a corresponding user definition, group definition, role definition, or other definition that defines the attributes and/or membership of that collection. In an embodiment, a principal is an entity corresponding to an identity managed by the computing resource service provider, wherein the computing resource service provider manages permissions for the identity and wherein the entity includes one or more sub-entities, which themselves may have identities.

The principal 202, in an embodiment, communicates with the computing resource service provider 206 via one or more connections (e.g., transmission control protocol (TCP) connections). In an embodiment, the principal 202 uses a computer system client device to connect to the computing resource service provider 206 and refers to any device that is capable of connecting with a computer system via a network, such as example devices discussed below. In an embodiment, the network 204 includes the Internet or another network or combination of networks discussed below.

In an embodiment, a user's request to access the service 208 is received by a service frontend 210, which comprises a web server configured to receive such requests and to process them according to one or more policies associated with the service 208. The request for access to the service 208, in an embodiment, is a digitally signed request and, as a result, is provided with a digital signature. In an embodiment, the web server employs techniques described herein synchronously with processing the requests. In an embodiment, the service frontend 210 routes the request and the digital signature for verification to an authentication service 216. The authentication service 216 may be a stand-alone service or may be part of a service provider or other entity. The authentication service 216, in an embodiment, is a computer system configured to perform operations involved in authentication of principals.

Upon successful authentication of a request, the authentication service 216, in an embodiment, obtains policies applicable to the request. In an embodiment, a policy is applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216, in an embodiment, transmits a query to a policy repository 218 managed by a policy management service 220. The query to the policy repository 218, in an embodiment, is a request comprising information sufficient to determine a set of policies applicable to the request. The query to the policy repository, in an embodiment, includes a copy of the request and/or parameters based at least in part on information in the request, such as information identifying the principal, the resource, and/or an action (operation to be performed as part of fulfillment of the request).

A policy management service 220, in an embodiment, provides access to, and administration of, policies applicable to requests (e.g., web service application programming interface requests) for managing permissions, such as permissions associated with a role, or more specifically, a service-linked role. In an embodiment, the policy management service 220 receives information sufficient for selecting policies applicable to pending requests. In an embodiment, the information includes copies of the requests and/or information generated based at least in part on the requests. In an embodiment, a service such as the service frontend 210 receives a request to delete a service-linked role and generates a query to the policy management service based at least in part on information specified by the request such as the caller, the role to be deleted, and an identifier of a service associated with use of the role.

In an embodiment, access patterns of multiple resources are analyzed as part of determining the mapping of an accessed resource to a set of permissions. In an embodiment, accessing only one data object of a data container maps to a policy that only grants security permissions to access that one data object—however, if two or more data objects of the data container are accessed during a baselining period, then the access of the two objects may map to granting access to all objects of the container. In an embodiment, if a principal accesses one or more resources under a single configuration during the baselining period, that activity maps to a policy that grants permissions only the access resources under that configuration. In an embodiment, a principal initializes and use virtual machine instances to perform tasks, but may do so using a single configuration (e.g., based on CPU, memory, operation system, and other virtual machine settings).

Having obtained any policies applicable to the request, the authentication service 216, in an embodiment, provides an authentication response and, if applicable, the obtained policies back to the service frontend 210. The authentication response indicates whether the response was successfully authenticated, in an embodiment, and the service frontend 210 then checks whether the fulfillment of the request for access to the service 208 would comply with the obtained policies using an authorization module 212.

In an embodiment, the authorization module 212 is a process executing on the service frontend that includes executable code that, if executed by one or more processors of a computer system, cause the computer system to compare the request to the one or more permissions in the policy to determine whether service may satisfy the request (i.e., whether fulfillment of the request is authorized). In an embodiment, the authorization module 212 may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network. In an embodiment, an authorization module is implemented as a software and/or hardware component of an authorization service.

In an embodiment, if the fulfillment of the request for access to the service 208 complies with the applicable obtained policies, the service frontend 210 may fulfill the request using the service backend 214. A service backend 214 may be a component of the service configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

In an embodiment, the request database 222 is a database service which may be a NoSQL database system that supports document and key-value store models. In an embodiment, the request database includes at least two tables—a first table corresponding to requests and a second table corresponding to a set of tasks that are collectively performed as part of fulfillment of the task. In an embodiment, the policy management service 220 receives a request to delete a service-linked role and adds a record to the first table if there does not already exist a request to delete the service-linked role. The request, in an embodiment, is fulfilled by performing a set of tasks 224, such as locking the service-linked role in a set of regions and, after confirming that the SLR is not in use by any session, deleting the role in each of the regions. In an embodiment, a task is associated with locking a specific region, and a task is associated with deleting a SLR in a specific region. In an embodiment, a task execution system polls the request database 222 for tasks 224 when computing resources are available (e.g., a worker thread of a thread pool is idle), identifies a task to execute, provides context information to a worker thread to perform the task (e.g., a region identifier and an indication of the task to be performed), marks the task execution status as being "in progress" and then causes the worker thread to execute the task.

Figure 3:
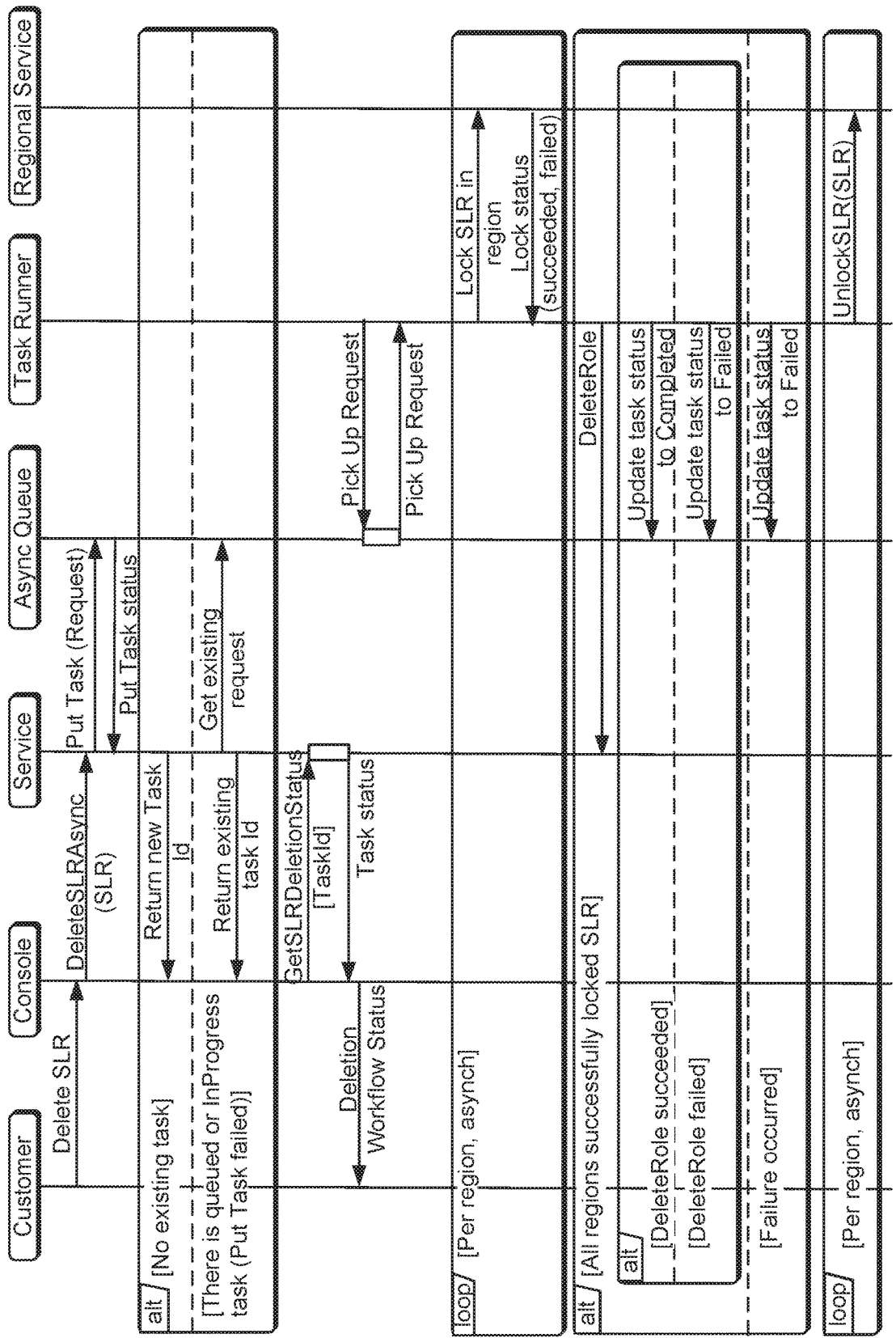
FIG. 3 illustrates a swim diagram for fulfilling a request, in which one embodiment may be practiced.

FIG. 3 illustrates a swim diagram 300 in which an embodiment in accordance with this disclosure is implemented. In an embodiment, the diagram 300 illustrates fulfillment of a request by a customer of a computing resource service provider to delete a service-linked role. In an embodiment, the techniques described in connection with FIG. 3 can also be utilized to modify a service-linked role (e.g., changing the set of permissions associated with a role).

In an embodiment, a customer uses a computing device to connect to a service computing resource service provider such as a policy management service. In an embodiment, the customer interacts with the service using a GUI console that includes buttons, icons, and other intractable elements that the customer is able to use to submit requests. In an embodiment, the customer interacts with a console of the policy management service to delete a service-linked role. In an embodiment, the customer pushes a "delete" button on the console to delete a particular SLR, and in response, the console generates and submits a request to the policy management service to delete the SLR, which may be identified by a unique resource name identifier. In an embodiment, the request is an asynchronous request.

In an embodiment, the request is submitted to the computing resource service provider and is authenticated and/or authorized using techniques described herein, such as those discussed in connection with FIG. 2. If the requestor is authorized and authenticated, the request is processed, in accordance with one embodiment. In an embodiment a request to delete a service-linked role is authenticated and authorized and then processed by the policy management service which coordinates with the service managing the SLR to ensure safe deletion. In an embodiment, a regional service lacks the ability to communicate between their regions in a single partition and/or does not do so. In an embodiment, a SLR created in a given partition is available to all regions within that partition, and services implement a mechanism for spotting usage of a SLR across those regions and allowing deletion of the role if no usage exists. In an embodiment, services are regional and lack the ability to communicate usage of a SLR across regions. In an embodiment, a subsystem or service of the computing resource service provider (e.g., the policy management service) handles the global role safety checks before deleting a role, and the service managing the role exposes an API that enables the subsystem or service coordinating the global behavior to freeze the use of the role for a specified period of time.

Requests to delete or modify roles such as service-linked roles are, in an embodiment, processed asynchronously since these requests are computationally expensive and may involve cross-region calls. In an embodiment, an asynchronous queue is utilized as part of a workflow management system that includes computing resources such as virtual machine instances and data storage systems that are utilized to process requests. In an embodiment, the policy management system pushes a task to process the request to the asynchronous queue, wherein the task includes information such as a role identifier and an operation to perform. In an embodiment, a response to putting the task in the asynchronous queue indicates a status, such as whether there is already a queued or in progress request for the role identifier. In an embodiment, the role identifier is a primary key of a database table. In an embodiment, if there is no existing tasks for the role, a new task identifier is returned, otherwise if there is an existing task from a previous request, the existing task identifier is returned to the console. In an embodiment, the console receives an indication that there was an existing task already, and gets the status of the existing task from the policy management service and provides the status to the customer. In an embodiment, the workflow status may have various statuses such as being completed successfully, failed, timed-out, in progress, and more.

In an embodiment, the workflow management system uses a queue or other suitable data structure as part of processing the request. Processing the request, in an embodiment, involves a task execution entity picking up a request from the asynchronous queue. In an embodiment, when a task execution entity picks up a task, the task becomes unavailable for other task execution entities. In an embodiment, the task execution entity marks the status of the task as being in progress. In an embodiment, the task execution entity performs an asynchronous routine in a loop to lock the SLR for deletion in a region. In an embodiment, the lock routine includes modifying a synchronization primitive that is used for the purposes of coordinating state across multiple computing entities. In an embodiment, the lock routine includes performing a locking operation (e.g., an operation to lock the use of the SLR in a region) in addition to other operations, such as performing a pre-delete cleanup routine or even optimistically deleting the SLR prior to determining that the SLR was successfully locked in all regions and relying on a rollback mechanism if it is later determined that the SLR in another region was not able to be locked. If the region cannot lock the SLR due to one or more resources blocking the role deletion in the region, an error code and/or the list of blocking resources is returned.

In an embodiment, the lock status is returned in response to an API call to lock the SLR for a particular region. In an embodiment, if the lock status for any region indicates a failure (e.g., due to resources being in use), then the SLR in each region is unlocked and the customer request fails, but if the lock status for all regions is successful, then the system is able to perform a subroutine to delete the role. In an embodiment, the lock status is returned asynchronously. In an embodiment, task execution entities delete the service-linked role in each region by calling a policy management service API that deletes the role from the particular region. In an embodiment, the task status for the deletion of the role in each region is updated in a database table of the workflow management system that tracks the progress of activities performed as part of the task. In an embodiment, the service-linked role is unlocked in each region regardless of the outcome, as the asynchronous task no longer requires the service-linked role to be locked afterwards. In an embodiment, the deletion or modification of service-linked roles can be in different states, some of which are non-failure states that are expected in the normal course of operations and failure states that are not expected in the normal course of operations.

In an embodiment, the service endpoint is inferred from the service principal managing a role. In an embodiment, the service principal name is extractable from the service-linked role, and the service managing SLR uses a specific format for the endpoint provided to the policy management service that is going to be used in the SLR deletion workflow. In an embodiment, the endpoint format is defined as a uniform resource location (URL) that encodes role information, service information, and region information. In an embodiment, the service endpoint can be determined without querying or using RIP configuration data.

In an embodiment, the asynchronous queue can be implemented using a workflow management service of the computing resource service provider wherein workflows are handled by deciders and activities. In an embodiment, deciders poll for decision tasks that generate execution tasks, while activities poll for execution tasks. In an embodiment, when a request is received by the policy management service, it starts a new workflow execution using the workflow management service, and the workflow management service guarantees workflows with the same identifiers will be started at most once, hence requests are idempotent. In an embodiment, the deciders pick up decision tasks and convert them to activity tasks. In an embodiment, the decision tasks are the SLR deletion requests, and the activities perform the actual deletion workflow and update the status. In an embodiment, for each workflow execution instance, the workflow management service assigns a unique run identifier and returns it when the execution starts, allowing customers to track the execution instance by using the run identifier to query the workflow management service. In an embodiment, the run identifier along with a workflow identifier is used to describe a specific execution.

In an embodiment, the asynchronous queue is implemented using a relational database to store asynchronous requests coming to the policy management service. In an embodiment, the relational database used to store asynchronous requests provides guarantees of strong consistency, thereby eliminating the possibility of multiple workers picking up the same task at the same time, and requests are guaranteed to be idempotent.

Figure 4:
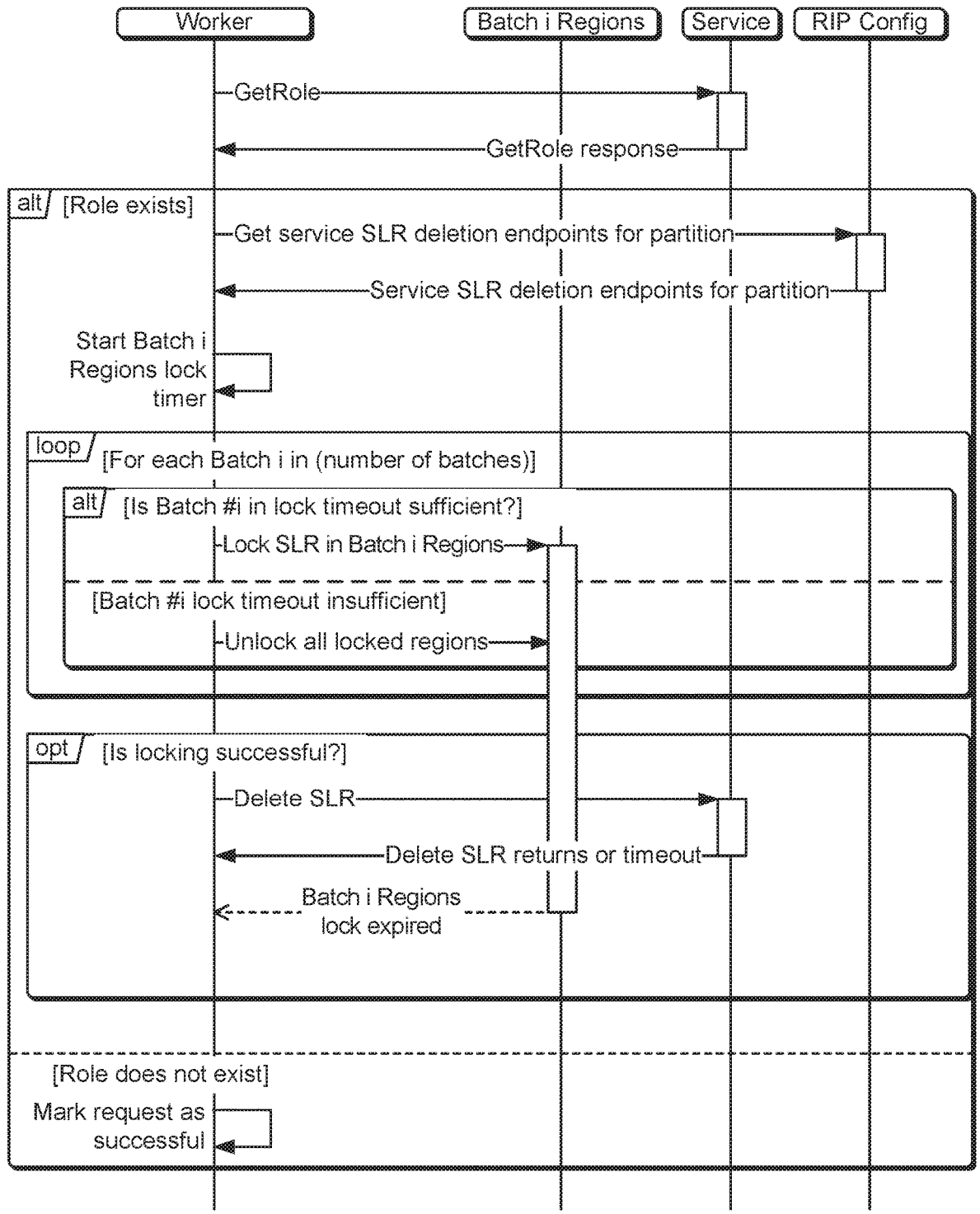
FIG. 4 illustrates a swim diagram for deleting a service-linked role in which one embodiment may be practiced.

FIG. 4 illustrates a swim diagram 400 in which an embodiment in accordance with this disclosure is implemented. In an embodiment, the diagram 400 illustrates a workflow for deleting a service-linked role. In an embodiment, the techniques described in connection with FIG. 4 can also be utilized to modify a service-linked role (e.g., changing the set of permissions associated with a role).

In an embodiment a worker is a worker thread of a pool of worker threads. The worker, in an embodiment, is managed by a worker pool management system. In an embodiment, the workers are nodes of a distributed system are utilized to execute one or more tasks, such as by running tasks in separate threads of a node in a parallelized manner (e.g., multi-threaded execution environment). The worker pool management system, in an embodiment, is a computer system or component that includes executable code that causes a computer system to manage the total number of worker threads in the pool, tracks and manages the status of the worker threads (e.g., whether a worker thread is idle or executing a task job). In an embodiment, the worker submits a request to the policy management service to get a role by providing a resource name identifier associated with the role to be deleted. In an embodiment, the policy management service authenticates and authorizes the request, and if the worker is authorized and authenticated, a response to the role is provided to the worker. In an embodiment, the response includes a security toke n that is usable to assume the requested role, indicating that the role exists; if the response indicates that the role does not exist (e.g., as indicated by an error code), however, then the request is marked as successful.

In an embodiment, if the role exists, the worker processes deletion of the role in batches. A batch, in an embodiment, refers to a set of one or more partitions or regions that are concurrently processed. In an embodiment, each batch is a list of concurrent calls to a specific number of regions depending on the partition—a first batch may include a plurality of regions based on physical geographic location of the regions. In an embodiment, the worker obtains, for a service, the service-linked role endpoint from configuration data such as a RIP configuration described elsewhere in this disclosure. In an embodiment, the SLR deletion endpoints for each region or partition can be customized and different deletion endpoints may exist for different partitions. In an embodiment, a first service endpoint is reachable using a first API and a second different service endpoint is reachable using a second different API.

In an embodiment, the worker calculates a batch lock timer that refers to a maximum time for the worker to complete a task. In an embodiment, the batch lock timer refers to a lock timer value that depends on the number of batches, expected maximum latency for the locking request, and the deletion activity time spent after locking. In an embodiment, the batch lock timer is calculated based on maximum threshold times that are defined in RIP configurations. In an embodiment, the batch lock timer is calculated based on probabilistic estimations, such as a computation of a timer value that gives a 90% probability that the locking will occur within that time based on statistics (e.g., mean, median, mode, standard deviation) of the latency and deletion activity times. In an embodiment, the batch lock timer is started before, after, or concurrent with the worker obtaining the SLR deletion endpoints.

In an embodiment, the worker loops one or more batches and for each batch, checks whether the batch lock timer is sufficient, and locks the SLR for each region in the batch. In an embodiment, if the lock timeout is insufficient or any service SLR deletion endpoint returns a failure and/or an indication that the SLR is in use, the worker aborts the deletion routine by unlocking all previously locked regions and marking the request as failed. In an embodiment, the worker also provides an indication of a particular region and/or particular computing resource whose usage prevented deletion of the SLR.

In an embodiment, if the locking of all regions was successful, the worker then calls the policy management service to delete the service-linked role. In an embodiment, the worker first verifies that the any and all batch lock timers are unexpired. After deleting the role, the worker marks the request as successful, and optionally unlocks the SLR in all regions as a precautionary measure.

Figure 5:
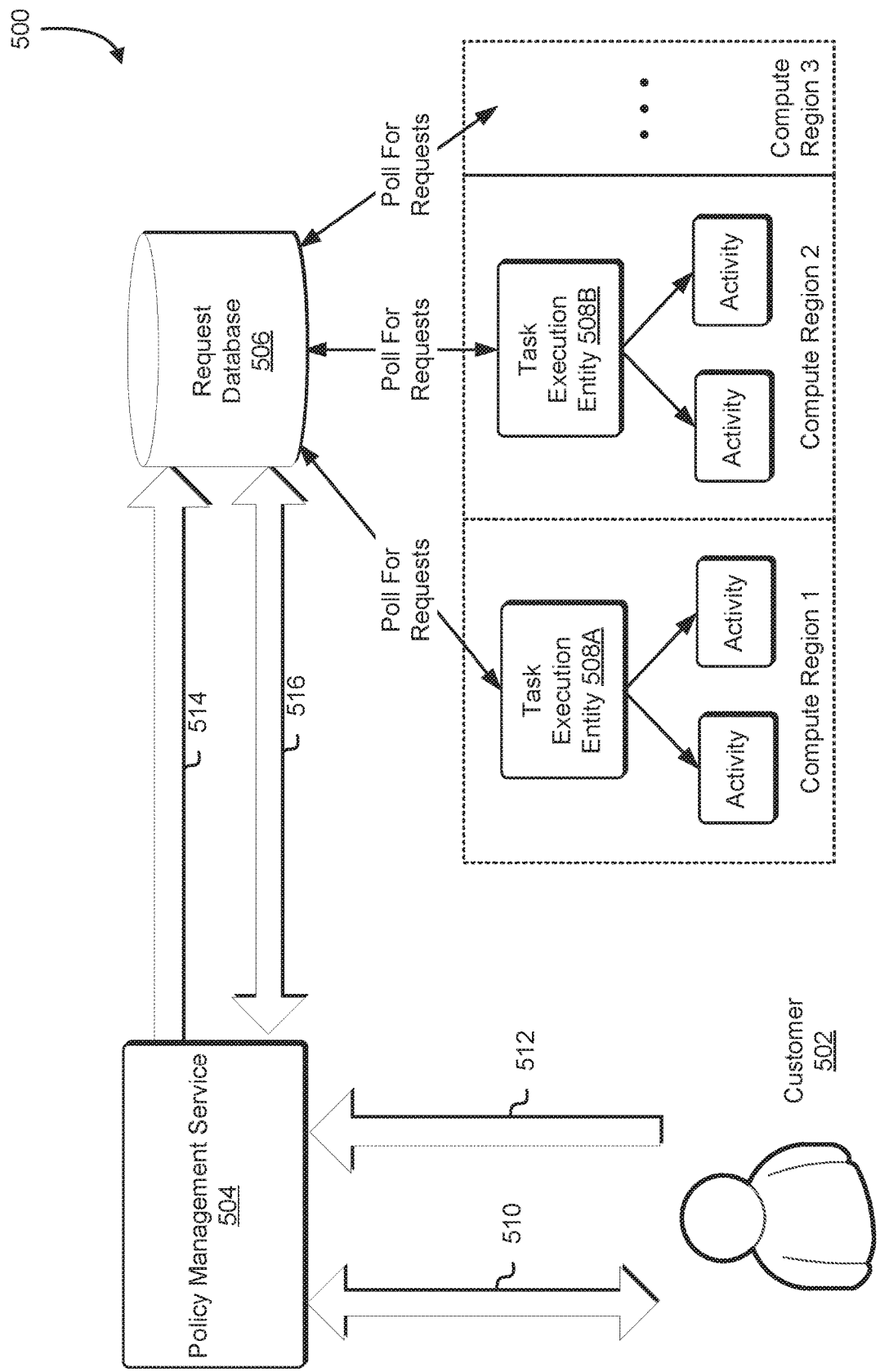
FIG. 5 illustrates a system in which one embodiment may be practiced.

FIG. 5 illustrates a diagram of a system 500 in which an embodiment in accordance with this disclosure is implemented. In an embodiment, the diagram illustrates a system 500 in which a database system is utilized to implement an asynchronous queue. In an embodiment, the techniques described in connection with FIG. 5 can also be utilized to modify a service-linked role (e.g., changing the set of permissions associated with a role).

In an embodiment, the customer 502 uses a client computing device of a computing resource service provider and submits a command 512 to delete a service-linked role. The command 512, in an embodiment, is submitted by the customer 502 interacting with a client computer system in any suitable manner, such as via a command line interface or a web-based console, to a policy management service 504. In an embodiment, the command is submitted with an identifier associated with the service-linked role and an indication of the requested operation (e.g., to delete a role, to modify the set of permissions associated with the role). In an embodiment, the status or progress of the command is accessible via a second command 510, which may be submitted via a query to the policy management service 504 and displayed in a GUI console to show the customer 502 the progress of a SLR deletion operation and additional information such as whether the operation succeeded.

In an embodiment, the customer 502 uses a command-line interface or a GUI console to submit a request to a policy management service 504 to delete a service-linked role. In an embodiment, the policy management service 504 performs the deletion of a service-linked role as part of a request by the customer 502 to unsubscribe from a service that uses the service-linked role. A policy management service 504, in an embodiment, provides access to, and administration of, policies applicable to requests (e.g., web service application programming interface requests) for managing permissions, such as permissions associated with a role, or more specifically, a service-linked role. In an embodiment, the customer 502 request to the policy management service 504 is authenticated and authorized prior to the policy management service 504 performing steps to fulfill the request. In an embodiment, the policy management service 504 pushes 516 a new request to the request database 506 to perform the customer request. In an embodiment the policy management service 504 can query 514 progress of the request.

In an embodiment, the policy management service 504 utilizes an asynchronous queue to fulfill the request and the synchronous queue is implemented at least in part using a request database 506. In an embodiment, the policy management service 504 pushes a new request to the request database 506 to perform the operation (e.g., delete a role, modify the permissions associated with a role) by submitting a request to create a new entry in a first database table of the request database 506 associated with the customer request. In an embodiment, customer requests to delete a SLR are idempotent, meaning that the first database table of the request database has at most one entry in the first database table associated with deletion of a particular SLR (note that the request database supports simultaneous deletion of different SLRs). In an embodiment, the request database 506 has a second database table for tasks performed in association with the fulfillment of customer requests.

In an embodiment, the first database table of the request database 506, also referred to as a request database table, includes one or more of the following keys: a primary key that is used to ensure customer requests (e.g., customer request to delete a role) are idempotent; a task identifier used to track the SLR deletion workflow execution instance (used for status checks); a status of the customer request (new, in progress, completed successfully, failed due to resource in use, failed due to time out, etc.); task input data, which may be encoded as a JavaScript Object Notation (JSON) serialized object string that captures input to the execution instance; a task type associated with the type of task being performed (e.g., deletion of a role, modification of a service-linked role); a timestamp corresponding to when the request was created; a timestamp corresponding to a time on and/or before which the customer request must be completed; and combinations thereof. In an embodiment, an idempotent request refers to a request that will not result in a new entry in the request database table if an entry for that customer request already exists. In an embodiment, the primary key value may be based at least in part on a resource name identifier associated with a role, the operation to be performed, or a combination thereof. In an embodiment, the task identifier is a foreign key (e.g., the primary key of the second database table).

In an embodiment, the second database table of the request database 506, also referred to as a task database table, includes one or more of the following keys: a primary key corresponding to the execution instance identifier; a status of the task; task output data, which may be encoded as a JSON serialized object string that captures output of the execution instance; task metadata, which may be encoded as a JSON serialized object string that includes metadata about the task (e.g., in unencrypted form); a task type associated with the type of task being performed (e.g., deletion of a service-linked role, modification of a role); a tag applied to the task for quick lookup; a worker host identifier; a timestamp corresponding to when the request was created; a timestamp corresponding to a time on and/or before which the customer request must be completed; and combinations thereof. In an embodiment, a task execution entity such as the task execution entities 508A and 508B illustrated in FIG. 5 poll for requests and executes tasks. In an embodiment, a task execution entity detects a new customer request in the customer request database table, picks up the request, marks the request as being in progress, and creates a corresponding record in the task database table, as described above. In an embodiment, the task execution entity performs various activities on behalf of the requestor, such as calling a regional service endpoint to lock a service or calling the policy management service to delete a role.

A system, in an embodiment, is implemented at least in part using a task execution framework that coordinates the activity of one or more nodes of a distributed system. In an embodiment, the nodes of the distributed system include one or more computer systems that are collectively used to process requests. In an embodiment, the nodes of the distributed system refer to physical computer servers, virtual machine instances, process or threads running on a computer system (or virtualization thereof), and any combination thereof. In an embodiment, a first node of the distributed system coordinates the execution of activities by other nodes running across multiple compute regions. The first node, in an embodiment, is a task execution entity that coordinates the locking of a service-linked role across multiple regions by providing locking instructions to nodes in each compute region that the service-linked is usable within, and upon receiving an affirmative indication that the service-linked role is successfully locked by each of the additional nodes, submits a request to the policy management service 504 to modify or delete the service-linked role.

In an embodiment, the system 500 of FIG. 5 supports a cleanup entity that runs as a background thread in each task execution entity host that continuously checks the sanity of requests. In an embodiment, timed out in-progress requests are checked for final status and then updated accordingly, as it is possible that a timed out request completed successfully. In an embodiment, the cleanup is implemented as a task that is executed by a task execution entity described elsewhere in this disclosure. In an embodiment, the cleanup is performed on a periodic basis, and the cleanup task includes obtaining a list of all pending requests that have a status indicating the request is in progress or is in a pending state, loops through the each request and gets a task associated with the request, wherein a task identifier of the task is included as a record of the request. In an embodiment, if the task does not exist, the request status is set to new, indicating that no progress has been made towards fulfilling the request; if the task exist, the system optionally checks if the task is still in progress, and then check whether the service-linked role still exists—if the SLR exists (e.g., checked using a principal identifier) then the task status is marked as failed; if the SLR does not exist the task status is set to completed. In an embodiment, the request record is deleted after setting the task status to failed or completed.

Figure 6:
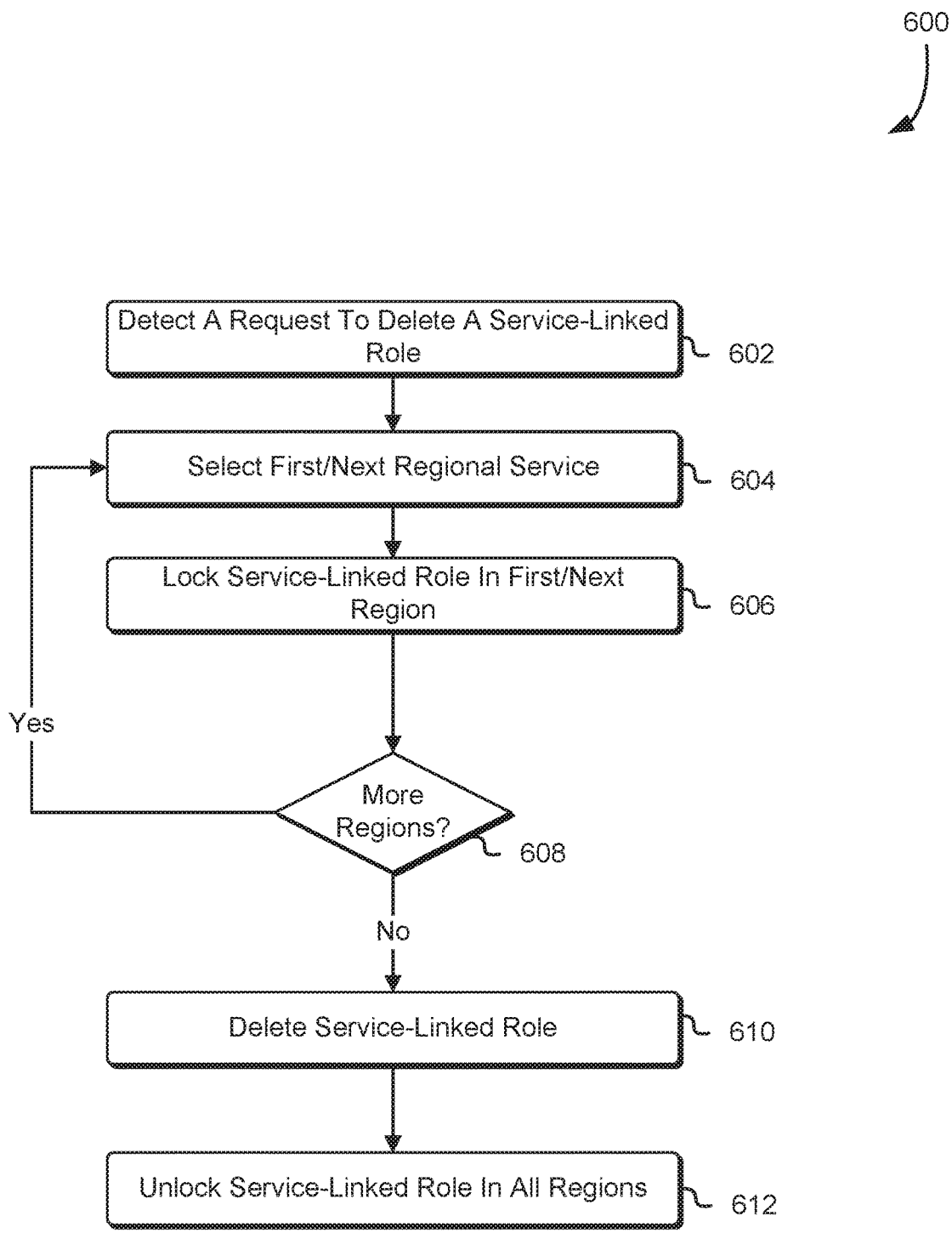
FIG. 6 illustrates process for deleting service-linked roles, in accordance with one embodiment.

FIG. 6 illustrates a process 600 for managing access to computing resources of a computing resource service provider, in accordance with one embodiment. The process 600, in an embodiment, is implemented using hardware, software, or a combination thereof. In an embodiment, the process is implemented in accordance with FIGS. 1-5. In an embodiment, the process is implemented by any suitable asynchronous queue, such as those described in connection with FIG. 5.

In an embodiment, a system includes executable instructions that, if executed by one or more processors, cause the system to detect 602 a request to delete a service-linked role. In an embodiment, the system detects the request by polling a table of a database for customer requests and detects a customer request to delete a SLR with a status of "new" or any other suitable indication that the customer request is not being processed by another computing entity. In an embodiment, the system selects 604 a first regional service from a list of regional services that support use of the SLR. In an embodiment, the system locks 606 the SLR from use in the first region, which may be performed in any suitable manner, such as by obtaining the regional service endpoint to lock the SLR from configuration data associated with the region. In an embodiment, if the system fails to lock the SLR in any region, the request to delete the SLR fails and all regions are unlocked. In an embodiment, the system checks whether 608 there are more regions to enumerate, and repeats steps 604-606 for each regional service that supports use of the SLR. In an embodiment, the SLR must complete the locking process and/or the deletion process within a timeout period. In an embodiment, the system, after determining that the SLR was successfully locked in each region and not in use in those regions, makes a call to a policy management service to delete 610 the service-linked role. In an embodiment, the request to delete the service-linked role can succeed or fail, but regardless of the result, the system will further make calls to unlock 612 the service-linked in each region. In an embodiment, the system optionally unlocks the service-linked role based upon detecting that the deletion failed.

Figure 7:
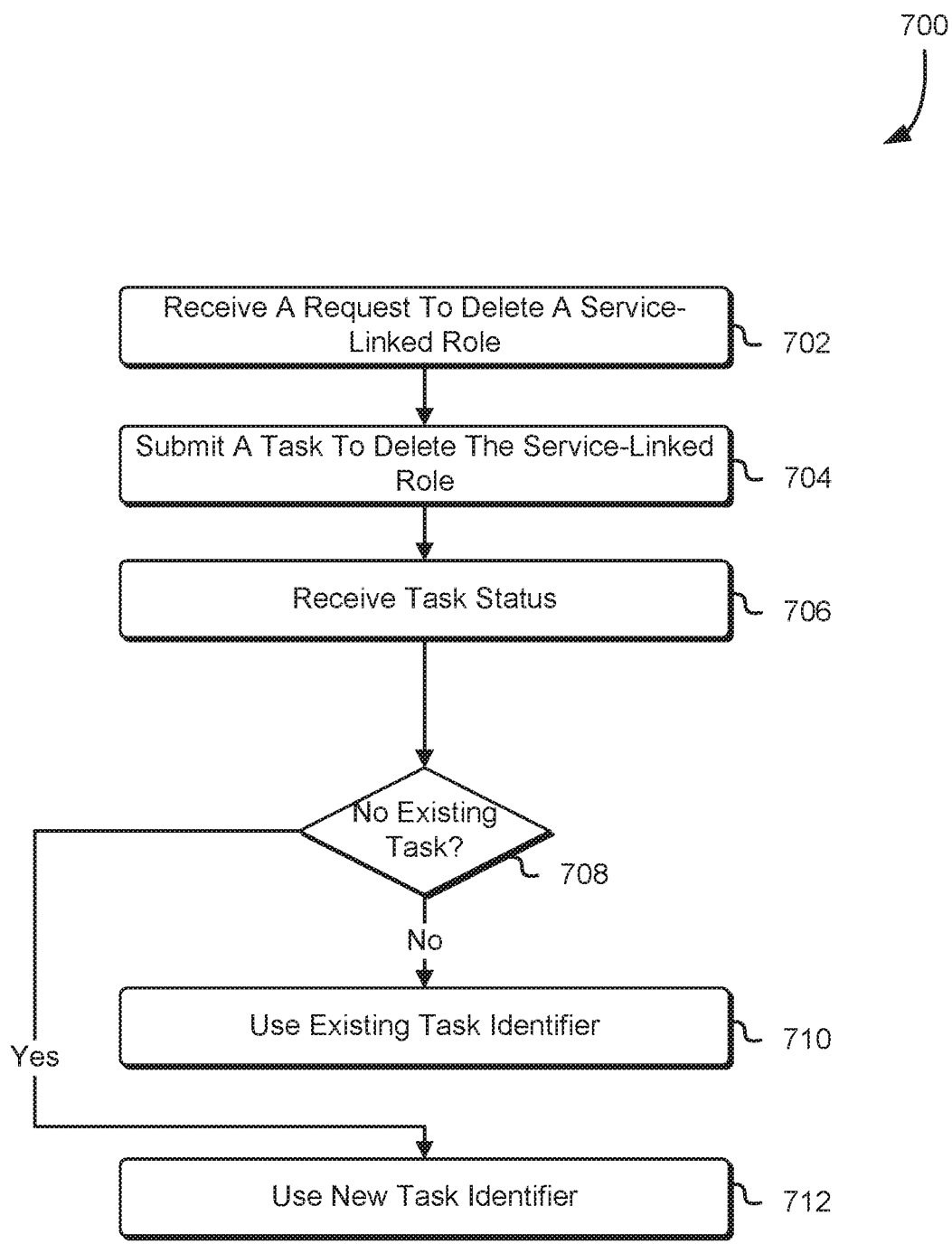
FIG. 7 illustrates process for idempotent requests, in accordance with one embodiment.

FIG. 7 illustrates a process 700 for managing access to computing resources of a computing resource service provider, in accordance with one embodiment. The process 700, in an embodiment, is implemented using hardware, software, or a combination thereof. In an embodiment, the process is implemented in accordance with FIGS. 1-5. In an embodiment, the process is implemented to support idempotent requests.

In an embodiment, a system includes executable instructions that, if executed by one or more processors, cause the system to receive 702 a request to delete a service-linked role. In an embodiment, the request is a request to delete a role, modify the permissions associated with a service-linked role, etc. The request, in an embodiment, is received from a customer of a computing resource service provider. In an embodiment, the system is a policy management service of a computing resource service provider that calls an asynchronous queue and submits 704 a task to delete the service-linked role. In an embodiment, the asynchronous queue is implemented at least in part using a database that has a primary key based on a resource identifier of a role, and multiple records having the same role identifier is disallowed. In an embodiment, the system receives 706 a task status that indicates whether 708 there was an existing task. If there is an existing task, the system uses 710 the existing task identifier by querying the asynchronous queue for the existing request and corresponding identifier. If there is not an existing task, in an embodiment the system 712 receives the generated task identifier in a response to submission of the task and uses the task identifier to query the status of the task, provide notifications to a customer when the status updates, and more.

Figure 8:
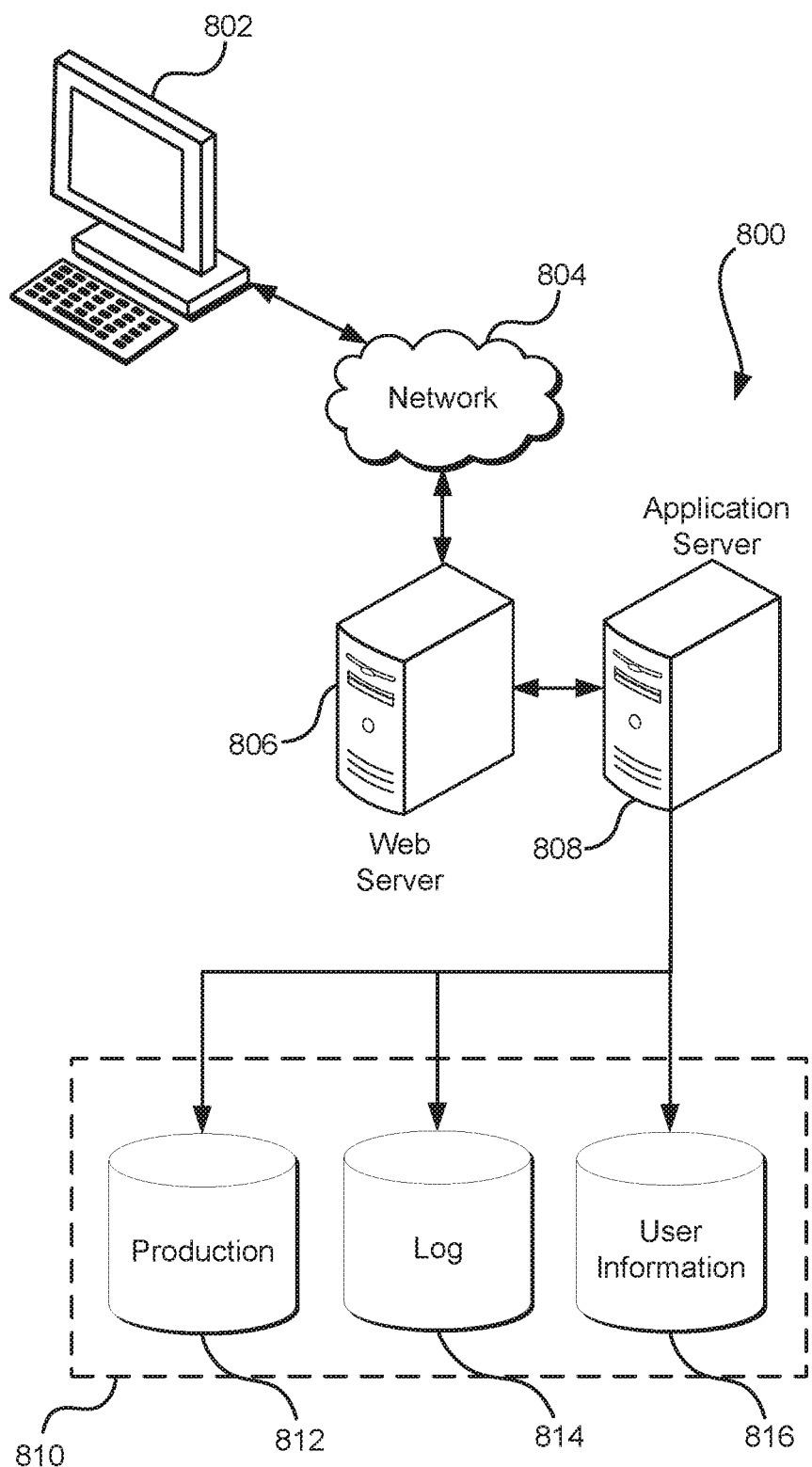
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a request to perform an operation on a set of permissions, wherein a role includes the set of permissions and the role is available to a service in multiple regions of a service provider to use the set of permissions to access resources on behalf of an entity associated with the service provider, and the operation includes deleting or modifying the role;
   submitting a plurality of tasks to concurrently lock the role from being used in the multiple regions, a first task of the plurality of tasks, as a result of execution, locks the role from being used to access the resources, based at least in part on a permission of the set of permissions, within a subset of regions of the multiple regions that form a batch of regions, wherein the batch of regions includes a first region that lacks at least one hardware component with at least one other region of the multiple regions;
   as a result of the plurality of tasks successfully concurrently locking the role from being used in the multiple regions within a timeout period associated with at least one of the batch of regions, performing the operation on the set of permissions while the set of permissions is prevented from being used by the service in the multiple regions; and
   as a result of determining that the operation is no longer performed on the set of permissions, causing the role to be unlocked in the multiple regions.

2. The computer-implemented method of claim 1, wherein the first task comprises:
   determining an endpoint for the first region;
   submitting a different request to the endpoint to lock use of the role in the first region; and
   obtaining an indication that the request successfully locked use of the role in the first region.

3. The computer-implemented method of claim 1, wherein two or more nodes of a distributed system concurrently lock use of the role in different regions of the multiple regions.

4. The computer-implemented method of claim 1, wherein the plurality of tasks includes a second task that concurrently lock use of the role in a second subset of regions of the multiple regions that form a second batch of regions.

5. A system, comprising memory to store instructions that, as a result of execution by one or more processors, cause the system to:
   obtain a request to perform an operation on a set of permissions, where the set of permissions are included in a role that is usable by one or more entities to obtain a grant of access to one or more computing resources associated with a set of services in a plurality of regions according to the set of permissions included in the role, and the operation includes deleting or modifying the role;
   submit a plurality of tasks to concurrently lock the role, as a result of executing a first task of the plurality of tasks, the set of services preventing the one or more entities from using the role to access the one or more computing resources associated with the set of services by using the role to obtain the grant of access to a resource of one or more computing resources in a batch of regions that include a subset of regions of the plurality of regions, wherein the batch of regions include a first region lacks at least one hardware component with at least one other region of the plurality of regions;

as a result of execution of the plurality of tasks successfully concurrently locking, within a timeout period associated with at least one of the batch of regions, the set of services from using the role to access the one or more computing resources within the plurality of regions, perform the operation on the set of permissions while preventing the set of services from using the set of permissions to access the one or more computing resources of the plurality of regions; and as a result of performing the operation on the set of permissions, cause the role to be unlocked in the plurality of regions.

6. The system of claim 5, wherein the instructions to submit the plurality of tasks further include instructions that cause the system to:

make available, to the set of services, an indication to prevent access to the set of permissions to access the one or more computing resources; and determine the set of services prevented access to the set of permissions to access the one or more computing resources.

7. The system of claim 6, wherein the instructions to make available, to the set of services, the indication to prevent access to the set of permissions to access the one or more computing resources include instructions that cause the system to:

determine a service endpoint for a service of the set of services; and submit a second request to the service endpoint, wherein the second request indicates to prevent access to the set of permissions to access the one or more computing resources based at least in part on the role.

8. The system of claim 7, wherein the instructions to determine the service endpoint include instructions that cause the system to determine the service endpoint based at least in part on information obtainable from a deployment package associated with the service.

9. The system of claim 5, wherein the instructions to perform the operation on the set of permissions while preventing the set of services from using the set of permissions to access the one or more computing resources include instructions that cause the system to perform the operation on the set of permissions within a threshold time.

10. The system of claim 9, wherein the threshold time is calculated based at least in part on information obtainable from a deployment package associated with a service of the set of services.

11. The system of claim 5, wherein the instructions to perform the operation on the set of permissions includes instructions to lose access to the one or more computing resources.

12. The system of claim 5, wherein the instructions to submit the plurality of tasks utilizes an asynchronous queue.

13. A non-transitory computer-readable storage medium storing executable instructions that, as a result of execution by one or more processors of a computer system, cause the computer system to at least:

obtain a request to perform an operation on a set of permissions, wherein the set of permissions are included in a role that is usable by a service to call other services on behalf of an entity with access to a set of regional services, and the operation includes deleting or modifying the role;

submit a plurality of tasks to lock the role in a plurality of regions, a first task of the plurality of tasks, as a result of execution, prevents use of the role to access resources, by the set of regional services based at least in part on the set of permissions included in the role, in a batch of regions that include a subset of regions of the plurality of regions, wherein the batch of regions include a first region that lacks at least one hardware component with at least one other region of the plurality of regions;

as a result of the plurality of tasks successfully preventing use of the set of permissions to access the resources by the set of regional services in the plurality of regions within a timeout period associated with at least one of the batch of regions, perform the operation on the set of permissions while preventing the set of regional services from using the set of permissions to access the resources; and cause the role to be unlocked in the plurality of regions as a result of determining that the operation is no longer performed on the set of permissions.

14. The non-transitory computer-readable storage medium of claim 13, wherein the role is usable by the set of regional services to fulfill one or more requests of the entity with access to the set of regional services.

15. The non-transitory computer-readable storage medium of claim 14, wherein the role is created in connection with use of the set of regional services by the entity.

16. The non-transitory computer-readable storage medium of claim 13, wherein:

the instructions further cause the computer system to:

cause generation of data in a first data structure, wherein the data includes status information associated with fulfillment of the request;

cause generation of other data in a second data structure in response to preventing a first service of the set of regional services from using the set of permissions to access the resources; and cause an update of the status information in response to performing the operation on the set of permissions; and the instructions that cause the system to perform the operation on the set of permissions are based at least in part on using the second data structure to determine the set of regional services have been prevented from using the set of permissions to access the resources.

17. The non-transitory computer-readable storage medium of claim 16, wherein the first data structure and the second data structure are tables of a database.

18. The non-transitory computer-readable storage medium of claim 16, wherein the entity lacks access to the second data structure.

19. The non-transitory computer-readable storage medium of claim 16, wherein the instructions to cause generation of the data include instructions that cause generation of the data to be contingent upon the first data structure lacking other data associated with fulfillment of the request.

20. The non-transitory computer-readable storage medium of claim 13, wherein services of the set of regional services are in different regions.

* * * * *